Patented Jan. 19, 1932

1,841,694

UNITED STATES PATENT OFFICE

OTTO P. AMEND, OF NEW YORK, N. Y., ASSIGNOR TO EIMER & AMEND, OF NEW YORK, N. Y., A CORPORATION OF NEW YORK

THERAPEUTIC IODINE SOLUTION

No Drawing. Application filed May 16, 1930. Serial No. 453,102.

The object of this invention is the production of a stable aqueous solution of iodine, practically neutral or slightly alkaline and incapable of precipitating albumen. This latter property renders it very penetrating. A solution of this kind may be taken internally, or injected hypodermically or intramuscularly. In making a solution of the kind desired, I use a caustic alkali solution, usually NaOH, and treat it with a slight excess of iodine; an amount somewhat in excess of one molecule of $I_2$ for 2NaOH, thereby forming a neutral solution. This is done in the presence of a stabilizing colloid which is best Irish moss. Albumen, peptone, nuclein and the like, that is albuminous bodies are apt to give solutions not permanent on standing.

In the best embodiment of my invention now known to me, 10 grams of Irish moss are washed thoroughly with cold distilled water until the saline contents are practically removed. The moss is then heated on a steam bath with a liter of distilled water, the thick mucilaginous liquid produced is strained through a fine cheese cloth and allowed to cool to room temperature. To this seventy (70) milliliters of normal caustic soda solution, containing 2.8 grams of caustic soda, are added and thereupon under constant stirring 12.7 grams of iodine, the agitation being kept up until all the iodine is dissolved. Thereupon the volume is brought up to 1 liter by the addition of distilled water. If the solution is to be used for injections, just enough of an alkaline bicarbonate is added, say .3 grams of sodium bicarbonate, to produce a faintly alkaline reaction. After filtration it is ready for use. It keeps indefinitely, even when exposed to sunlight. When taken internally, any formation of hydriodic acid in the stomach by the action of gastric juices is inhibited.

As is well known, in reacting iodine with NaOH or other alkalis according to the following equation:

$$I_2 + 2NaOH = NaI + NaOI + H_2O$$

the reaction is not complete, some caustic alkali being left over. And the reaction products quickly go over to iodate. But by using a small amount of iodine in excess of the theoretical amount, conversion of the caustic alkali into the iodide and hypoiodite is complete and a neutral product results. In the above specific example, for instance, the iodine is used in the approximate proportion of 1.4 molecules to each 2 mols of caustic.

The alkaline earths may be substituted for the alkalis in this process, such as calcium or strontium hydroxide. In the place of Irish moss other non-nitrogenous protective colloids may be employed, thus algin may be used and when calcium hydroxide forms the base, gum Arabic.

I claim:

1. In the manufacture of therapeutical products containing iodine and of substantially neutral reaction, the process which comprises dissolving an alkali and a non-nitrogenous, protective colloid in water and thereafter adding sufficient iodine to produce a substantially neutral solution.

2. The process of claim 1 wherein the alkali used is caustic soda.

3. The process of claim 1 wherein the colloid used is Irish moss.

4. As a new therapeutical product, a neutral solution containing the reaction products of iodine with a caustic alkali in the presence of a non-nitrogenous, protective colloid, the iodine being present in sufficient excess to produce substantial neutrality.

5. The composition of claim 4 made with caustic soda as the alkali and with Irish moss as the colloid.

6. As a new therapeutical product, a substantially neutral solution containing the reaction products of iodine with a caustic alkali solution in the presence of a non-nitrogenous, protective colloid, the iodine and the caustic alkali having been reacted in the molecular proportions of about 1.4 to 2.

In testimony whereof I affix my signature.

OTTO P. AMEND.